(12) United States Patent
Mogensen

(10) Patent No.: US 7,625,538 B2
(45) Date of Patent: Dec. 1, 2009

(54) DIESEL PARTICULATE FILTER

(75) Inventor: Gurli Mogensen, Lynge (DK)

(73) Assignee: Haldor Topsoe A/S, Lyngby (DK)

( * ) Notice: Subject to any disclaimer, the term of this patent is extended or adjusted under 35 U.S.C. 154(b) by 887 days.

(21) Appl. No.: 10/876,568

(22) Filed: Jun. 28, 2004

(65) Prior Publication Data

US 2005/0002838 A1    Jan. 6, 2005

(30) Foreign Application Priority Data

Jul. 2, 2003    (DK)    ............... 2003 00999
Aug. 15, 2003    (DK)    ............... 2003 01173

(51) Int. Cl.
*B01D 47/00*    (2006.01)

(52) U.S. Cl. ............ 423/213.5; 502/312; 423/212; 423/213.2

(58) Field of Classification Search ............ 423/212, 423/213.2, 213.5

See application file for complete search history.

(56) References Cited

U.S. PATENT DOCUMENTS

| | | | |
|---|---|---|---|
| 4,522,357 A | 6/1985 | Bains et al. | |
| 4,968,322 A | 11/1990 | Miyawaki et al. | |
| 5,593,464 A | 1/1997 | Cook et al. | |
| 5,756,057 A * | 5/1998 | Tsuchitani et al. | ....... 423/213.2 |
| 6,488,725 B1 * | 12/2002 | Vincent et al. | ............... 44/358 |
| 6,753,294 B1 * | 6/2004 | Brisley et al. | ............... 502/439 |
| 2003/0104932 A1 | 6/2003 | Kim | |
| 2004/0033175 A1 * | 2/2004 | Ohno et al. | ............... 422/180 |

FOREIGN PATENT DOCUMENTS

| | | |
|---|---|---|
| EP | 0 888 816 | 1/1999 |
| EP | 1 214 973 | 6/2002 |
| EP | 1 338 322 | 8/2003 |
| WO | WO 02/26351 | 4/2002 |

\* cited by examiner

*Primary Examiner*—Jessica L Ward
*Assistant Examiner*—Nicholas P D'Aniello
(74) *Attorney, Agent, or Firm*—Dickstein Shapiro LLP

(57) ABSTRACT

The invention provides a process and filter for catalytic purification of exhaust gas from a diesel engine by passing the exhaust gas through a wall flow filter provided with material being catalytic active in the reduction of nitrogen oxides to nitrogen and oxidation of carbonaceous compounds to carbon dioxide and water. The wall flow filter is prepared from silicon carbide and provided with a layer of titanium dioxide on its surface and wherein the catalytic active material comprises oxides of vanadium, tungsten and metallic palladium.

6 Claims, 2 Drawing Sheets

DIESEL PARTICULATE FILTER

BACKGROUND OF THE INVENTION

1. Field of the Invention

The invention relates to a filter for cleaning exhaust gas from diesel engines. The invention is specifically directed to a wall flow filter for removal of $NO_2$, CO, incompletely combusted hydrocarbons and particulate matter in exhaust gas from a diesel engine.

The invention is further directed to use of fuel borne additives being added to diesel fuel prior to combustion and a catalysed wall flow filter arranged in exhaust gas channel of a diesel engine.

The invention has particular use in diesel engine driven cars, ships, trains, vans, lorries and similar, where the above impurities are formed and must be removed in order not to pollute the atmosphere. This removal will be a government requirement in more and more countries, as the pollution is harmful to human beings, animals and even buildings.

2. Description of Related Art

The harmful effect of exhaust gas from diesel engines has been known for a long time and several attempts have been made to solve this problem.

Kawanami et al. disclose in EP patent publication No. 0 888 816 a method for removal of $NO_x$ and particulate matters from diesel exhaust gas with a filter. The filter is covered with a layer of catalyst comprising Cu, Pr, Fe, Ce, Co, Ni, La and Nd. The filter catches soot particles which, however, will accumulate. Furthermore, test results show that the filter catalyst performs satisfactory at about 450° C. However, diesel exhaust gas often has a temperature much lower, especially when cars are driven at normal, moderate velocities.

Another catalyst for purification of diesel engine exhaust gas is described by Kim in the US patent application No. 2003/0 104 932, and this catalyst comprises Pt and Pd on a carrier of Zr-W oxide. The carrier is made by preparing a Zr-W containing $H_2SO_4$ gel, forming, drying and calcination, which is an elaborate method. The carrier is not especially durable at high temperatures, which occur when carbon from accumulated soot particles is oxidised.

It is further known that certain additives being added to the Diesel fuel prior to combustion reduce emission of particulate matter and unburned hydrocarbons. Those additives typically consist of oil-soluble organo-metallic complexes.

It has now been found that when using an exhaust gas filter being coated with a catalyst comprising various oxides and noble metals it is possible to remove impurities from diesel exhaust gas down to a very low level.

It has further been found that combination of catalytic treatment of exhaust gas from a diesel engine with the above metal oxide/noble metal catalyst composition and fuel born organo-metallic complexes further improve purification of diesel exhaust, in particular combustion of soot being trapped on the catalytic filter at lower temperatures.

SUMMARY OF THE INVENTION

The invention provides a process for catalytic purification of exhaust gas from combustion of a diesel fuel comprising passing the exhaust gas through a wall flow filter provided with material being catalytic active in the reduction of nitrogen oxides to nitrogen and oxidation of carbonaceous compounds to carbon dioxide and water. The wall flow filter is prepared from sintered silicon carbide particles and provided with a layer of titanium dioxide on surface of each particle and the catalytic active material comprises oxides of vanadium, tungsten and metallic palladium.

The invention also provides a wall flow filter for use in the purification of exhaust from a diesel engine, wherein the wall flow filter is prepared from sintered silicon carbide particles and provided with a porous layer of titanium dioxide on surface of each particle. The catalytic active material supported by the titanium dioxide comprises oxides of vanadium, tungsten and metallic palladium.

The invention provides furthermore a process for catalytic purification of exhaust gas from combustion of diesel fuel comprising adding to the fuel a predetermined amount of an oil-soluble metal complex being effective in oxidation of hydrocarbons and/or carbonaceous matter combusting the fuel and passing exhaust gas from the combustion through the wall flow filter.

By means of the process according to the invention the content of $NO_2$, CO, incompletely combusted diesel and soot in exhaust gas is reduced to a very low amount. Soot being trapped in the filter will be completely combusted with oxygen in the exhaust gas at low gas temperatures, even as low as 250° C. when metal complex is added.

Particular suitable diesel fuel additives for use in the invention comprise the above mentioned organo-metallic complexes with one or more metals selected from Group I and II, the lanthanides, iron and manganese. Those additives are known from the patent literature, see e.g. U.S. Pat. Nos. 6,488,725, 5,593,464, 4,968,322 and 4,522,357, the disclosure of which is incorporated herein by reference thereto.

A number of the additives are furthermore commercially available, such as Satacen and Octimax from Octel Corp.

Effective concentrations of the additives in the diesel fuel prior to combustion in a diesel engine are typically in range of 1-100 ppm.

By means of the process and filter according to the invention the content of $SO_2$ is not accumulated as condensed $H_2SO_4$ when the filter is cold, and combustion of accumulated soot will not create higher temperatures that the filter can withstand.

The filter can be installed in the exhaust system of a car, a van, a lorry, a train, a ship, or a vessel or similar.

DETAILED DESCRIPTION OF THE INVENTION

Figure 1:
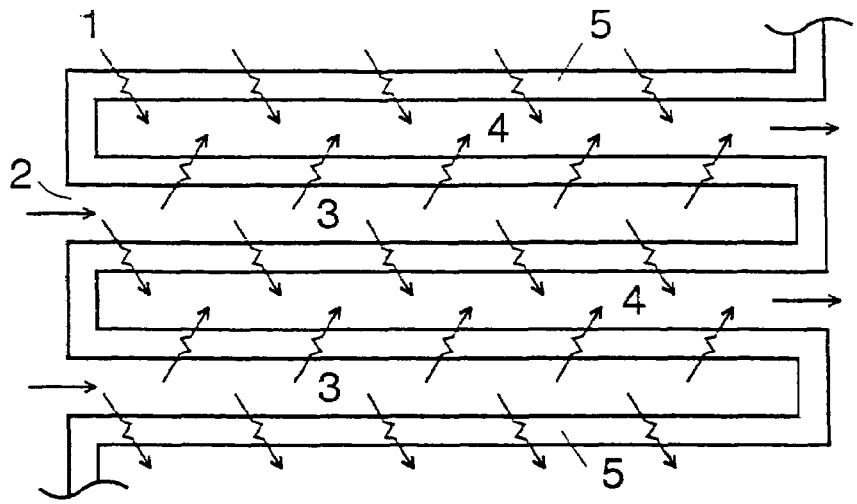
FIG. 1 is a wall flow filter shown as a side view and indicating the gas flow.

Hydrocarbons are combusted in air to $H_2O$, CO and $CO_2$. However, hydrocarbons of the petrochemical industry, such as diesel, never burn completely in engines and furthermore also S is present. Thereby, the exhaust gas from diesel engines also contains $SO_2$, partly converted hydrocarbons, C in form of soot particles and $NO_x$ as some $N_2$ from the air is oxidised.

Some of the soot is oxidised by the oxygen from the excess air, while the rest is oxidised simultaneously with reduction of $NO_2$ following:

$$C + O_2 \rightarrow CO_2$$

and $$NO_2 + C \rightarrow \tfrac{1}{2} N_2 + CO_2$$

$SO_2$ may be oxidised to $SO_3$ and accumulated in presence of $H_2O$ as $H_2SO_4$ at cooling.

The invention provides a process and a filter for the removal of carbonaceous compounds and nitrogen oxides, including $NO_2$, CO, remaining hydrocarbons and soot removal from diesel engine exhaust in accordance with the above reactions. The filter is a wall flow filter, which provides a high surface area and a flow path creating only a moderate pressure drop.

By the process according to the invention the temperature, where the above mentioned removal of impurities from the exhaust gas can take place, is lowered by a combined action of a fuel borne organo-metallic additive and the catalysed wall flow filter.

The filter body is prepared from SiC, which has a higher heat capacity, a higher thermal conductivity and a higher temperature for decomposition than $SiO_2$, $Al_2O_3$ and other materials traditionally selected for this purpose. Thereby, if carbon is locally accumulated in the filter the formed heat of oxidation is quickly distributed, the temperature rise is moderate and not higher than the filter can resist it.

The filter is prepared as SiC particles, which are sintered together. This creates a porous material with a pore size of 10-20μ.

A layer of $TiO_2$ is applied on the surface of the SiC particles and this layer acts as a catalyst carrier. The $TiO_2$ layer is applied by dipping to form a wash coat and the thickness of the layer is 50-100 nm. The $TiO_2$ is an advantageous material for an exhaust gas catalyst carrier, as $SO_2$ will not on this material accumulate as $H_2SO_4$, which is undesirable f. inst. in cars, when they are started with cold engine resulting in a fog of $H_2SO_4$ leaving the exhaust pipe of the car.

The catalyst support is impregnated with $V_2O_5$, $WO_3$, Pd and optionally Pt.

This catalyst will reduce $NO_2$ to $N_2$, oxidise the remaining hydrocarbons and oxidise CO. The filter will catch the soot particles and the catalyst will oxidise the soot to $CO_2$ when the engine is operating at normal operating temperatures.

The filter for use in the invention has shown to reduce $NO_2$, CO, remaining hydrocarbons and soot to a low level. This appears from the below test results.

The filter for use in the invention is prepared by applying $TiO_2$ on the SiC particles of the wall flow filter by wash coat method by dipping the filter in an aqueous slurry of $TiO_2$ followed by drying and calcination at 550° C. for 2-5 hours and repeating this one or more times.

The filter is impregnated with 20-50 g $V_2O_5$ per liter filter, preferably 25-35 g/liter, and 1-50 g $WO_3$ per liter filter, preferably 25-35 g/liter by filling the pores of the coated filter with a solution of inorganic salts of vanadium and tungsten stabilized by organic complexing agents known from literature. The such impregnated filter is dried and calcined at 550° C. for 2-5 hours to decompose the salts into the corresponding oxides.

Finally, the filter is impregnated with 0.25-1 g Pd per liter filter, preferably 0.4-1 g/liter and optionally with 0-2 g Pt per liter filter, preferably 0.0-0.4 g/liter. The impregnation is performed with Pd and optionally Pt salts by pore filling followed by drying and decomposition at 350° C. into the metallic state of the noble metals.

In FIG. 1 a wall flow filter 1 is shown. The exhaust gas is introduced at inlet 2. The filter contains a number of parallel channels, inlet channels 3 and equally as many outlet channels 4. The inlet channels are open at the inlet and closed at the outlet of the filter, while the outlet channels are closed at the inlet and open at the outlet of the filter. The filter is made of sintered SiC particles, and the walls 5 are thereby porous. The exhaust gas flows through the inlet channels 3, through the porous filter walls 5, out to the outlet channels 4 and out of the filter 1.

Figure 2:
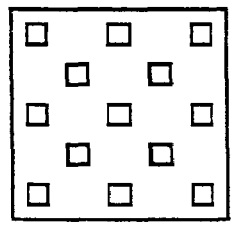
FIG. 2 is a wall flow filter seen from one of the ends.

The filter is seen from one of the ends in FIG. 2.

Figure 3:
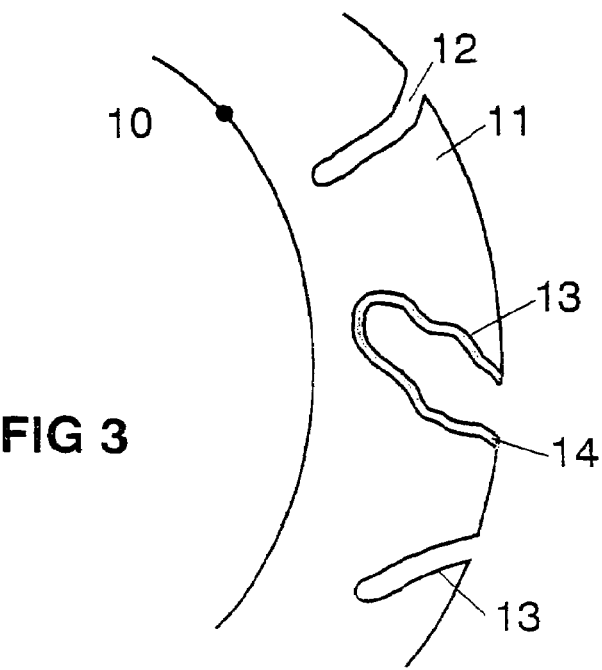
FIG. 3 is an expanded illustration.

In FIG. 3 the surface 10 of a SiC filter particle is shown on which the porous $TiO_2$ 11 is applied. The pores 12 of the $TiO_2$ 11 are impregnated on the surface 13 with the catalyst 14.

Figure 4:
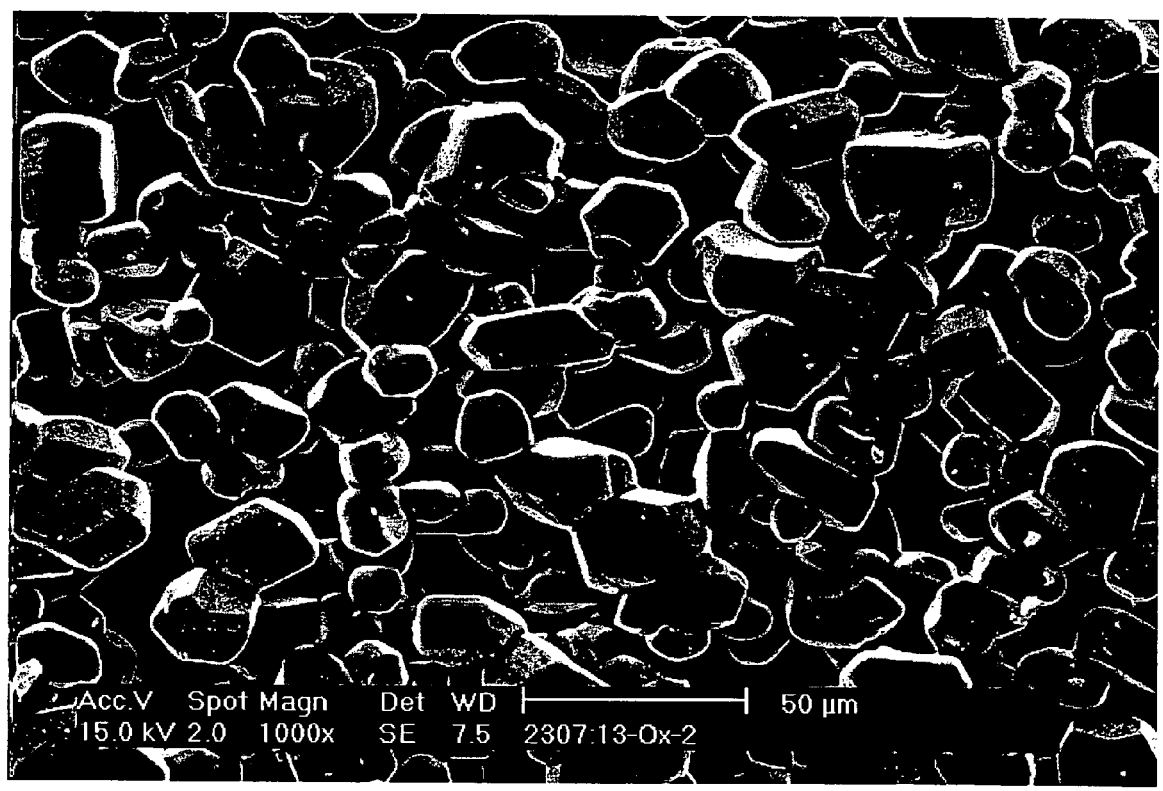
FIG. 4 is a scanning electron microscope photo of a cross section of a filter wall.

In FIG. 4 the particles in a part of a filter wall are seen. FIG. 4 is a photo taken by a scanning electron microscope. Each of the sintered particles on the photo is covered by a porous layer of $TiO_2$.

EXAMPLES

Example 1

A SiC wall flow filter was coated with $TiO_2$ wash coat corresponding to 80 g $TiO_2$ per liter filter after calcination.

It was impregnated with V and W corresponding to a total of 50 g oxides per liter filter after calcination with V constituting 30 wt % of the total impregnated metals. Finally, the filter was impregnated with 0.5 g Pd per liter filter.

Example 2

A filter prepared according to the method in Example 1 followed by impregnation with 2 g Pt per liter filter.

Example 3

A SiC wall flow filter was coated with $TiO_2$ wash coat corresponding to 85 g $TiO_2$ per liter filter after calcination.

It was impregnated with V corresponding to a total of 25 g oxides per liter filter after calcination. Finally, the filter was impregnated with 0.4 g Pd per liter filter followed by impregnation with 0.4 g Pt per liter filter.

Test Results

First emission tests from a diesel engine in a test bench were performed at two exhaust gas temperatures.

An exhaust gas containing soot particles, $N_2$, 11-13% $O_2$, 5-8% $CO_2$, water and 300-750 ppm $NO_x$, 50 ppm $NO_2$, 30-90 ppm remaining hydrocarbons, 100-120 ppm CO and further minor constituents, which were not analysed, were passed through the filters of the invention. The test results are shown in Tables 1 and 2.

Two more emission tests from a diesel engine in a test bench were then performed at two exhaust gas temperatures.

An exhaust gas from combustion of diesel fuel with 5-20 milligram of additive Octel Octimax™ per kg of diesel fuel and containing soot particles, $N_2$, 11-13% $O_2$, 5-8% $CO_2$, water and 300-750 ppm $NO_x$, 50 ppm $NO_2$, 30-90 ppm remaining hydrocarbons, 100-120 ppm CO and further minor constituents, which were not analysed, were passed through the filter as prepared in Example 1. The test results are shown in Tables 3 and 4.

In Tables 1, 2, 3 and 4, sample 1 refers to a filter prepared according to Example 1, sample 2 to Example 2 and sample 3 to Example 3. Prior art refers to test results disclosed in European patent Publication No. 0 888 816, Tables 2 and 3, where the tests were conducted at 350° C. and 450° C. in a similar test bench. The tests of the filter of the invention were conducted at 360° C. and 470° C. At outlet of filter the gas composition was determined by conventional analytical methods. Soot particles were collected on a conditioned glass filter and weighed after a certain time of constant engine operation.

Further, the temperature for oxidation of soot particles collected in the coated filter of the invention was determined by increasing the exhaust gas temperature and simultaneously measuring the pressure drop over the filter. When the soot starts to be removed by oxidation the pressure drop starts to decrease and the corresponding temperature is noted.

The Tables show reduction of the percentage content of $NO_2$, remaining hydrocarbons (HC), CO and particulate matters (PM) and the lower temperature of oxidation of C to $CO_2$ is shown in the last columns.

TABLE 1

Results for exhaust gas temperature 360° C.

| Sample No. | % Reduction in $NO_2$ | % Reduction in HC | % Reduction in CO | % Reduction in PM | Temperature for C removal |
|---|---|---|---|---|---|
| 1 | 70 | 83 | 92 | 97 | 450 |
| 2 | 55 | 81 | 99 | 94 | 420 |
| 3 | 64 | 83 | 61 | 95 | >550 |
| prior art 350° C. | 12-42 | 31-60 | — (minus) 15-30 | 16-22 | NA |

TABLE 2

Results for exhaust gas temperature 470° C.

| Sample No. | % Reduction in $NO_2$ | % Reduction in HC | % Reduction in CO | % Reduction in PM | Temperature for C removal |
|---|---|---|---|---|---|
| 1 | 10 | 80 | 95 | 98 | 450 |
| 2 | 5 | 74 | 52 | 97 | 420 |
| 3 | 16 | 77 | 99 | 93 | >550 |
| prior art 450° C. | 36-45 | 76-90 | 51-66 | 16-27 | NA |

TABLE 3

Results for exhaust gas temperature 360° C.

| Sample No. | % Reduction in $NO_2$ | % Reduction in HC | % Reduction in CO | % Reduction in PM | Temperature for C removal |
|---|---|---|---|---|---|
| 1 | 93 | 83 | 92 | 97 | 250 |
| prior art 350° C. | 12-42 | 31-60 | — (minus) 15-30 | 16-22 | NA |

TABLE 4

Results for exhaust gas temperature 470° C.

| Sample No. | % Reduction in $NO_2$ | % Reduction in HC | % Reduction in CO | % Reduction in PM | Temperature for C removal |
|---|---|---|---|---|---|
| 1 | 69 | 80 | 95 | 98 | 250 |
| prior art 450° C. | 36-45 | 76-90 | 51-66 | 16-27 | NA |

It must be noted that the results from prior art are referring to "reduction in $NO_x$" and that figures for reduction in $NO_2$ are not included in European patent publication No. EP 0 888 816. Thereby, the results can not be directly compared.

From the test results in Tables 1 and 2 it appears that the filter of the invention is highly active already at 360° C. and that it catches very efficiently soot particles.

From the test results in Table 3 and Table 4 it appears that by the combined action of the diesel additive and the filter of the invention soot particles are effective removed from the diesel exhaust at a temperature as low as 250° C.

The results also show the importance of the presence of W for the carbon oxidation.

Engines in cars and lorries operate with temperature variations and even though the exhaust gas in periods is around 400° C., it will also sometimes be above 500° C. and the carbon particles are oxidised. Further, as the oxidation is an exothermic reaction it will heat up the filter, which then maintains the temperature required for oxidation for a period. This is done without problems in a SiC filter with the high heat capacity and high temperature of decomposition.

What I claim is:

1. A process for catalytic purification of exhaust gas from combustion of a diesel fuel consisting of passing the exhaust gas through a wall flow filter impregnated with a material being catalytic active in both the simultaneous reduction of nitrogen oxides to nitrogen and oxidation of carbonaceous compounds to carbon dioxide and water, wherein the wall flow filter is prepared from sintered silicon carbide particles and provided with a layer of titanium dioxide on the surface of each particle and wherein the catalytic active material consists of metallic palladium, oxides of vanadium and tungsten, and optionally metallic platinum.

2. The process of claim 1, wherein the catalytic active material consists of
   20-50 g $V_2O_5$ per liter filter;
   1-50 g $WO_3$ per liter filter;
   0.25-1 g Pd per liter filter; and
   up to 2 g Pt per liter filter.

3. A diesel engine exhaust gas system comprising a wall flow filter, wherein the wall flow filter consists of sintered silicon carbide particles provided with a porous layer of titanium dioxide on the surface of each particle and a catalytic active material supported by the titanium dioxide, wherein the catalytic active material consists of metallic palladium, oxides of vanadium and tungsten, and optionally metallic platinum.

4. The diesel engine exhaust gas system of claim 3, wherein the catalytic active material consists of
   20-50 g $V_2O_5$;
   1-50 g $WO_3$ per liter filter;
   0.25-1 g Pd per liter filter; and
   up to 2 g Pt. per liter filter.

5. The diesel engine exhaust gas system of claim 3, wherein the catalytic active material consists of 25-35 g $V_2O_5$ per liter filter, 25-35 g $WO_3$ per liter filter, 0.4-1 g Pd per liter filter, and up to 0.4 g Pt per liter filter.

6. The process of claim 1, wherein the catalytic active material consists of 25-35 g $V_2O_5$ per liter filter, 25-35 g $WO_3$ per liter filter, 0.4-1 g Pd per liter filter, and up to 0.4 g Pt per liter filter.

* * * * *

UNITED STATES PATENT AND TRADEMARK OFFICE
CERTIFICATE OF CORRECTION

PATENT NO. : 7,625,538 B2  Page 1 of 1
APPLICATION NO. : 10/876568
DATED : December 1, 2009
INVENTOR(S) : Gurli Mogensen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1351 days.

Signed and Sealed this

Twenty-first Day of December, 2010

David J. Kappos
*Director of the United States Patent and Trademark Office*